(12) United States Patent
Briggs

(10) Patent No.: US 11,507,567 B2
(45) Date of Patent: Nov. 22, 2022

(54) FRAMEWORK FOR MANAGING TAG BUNDLES

(71) Applicant: J2 Innovations, Inc., Chino, CA (US)

(72) Inventor: Jason Briggs, Chino, CA (US)

(73) Assignee: J2 Innovations, Inc., Chino, CA (US)

( * ) Notice: Subject to any disclaimer, the term of this patent is extended or adjusted under 35 U.S.C. 154(b) by 139 days.

(21) Appl. No.: 16/934,660

(22) Filed: Jul. 21, 2020

(65) Prior Publication Data

US 2022/0027346 A1  Jan. 27, 2022

(51) Int. Cl.
```
G06F 3/048     (2013.01)
G06F 16/23     (2019.01)
G05B 19/042    (2006.01)
G06F 3/0482    (2013.01)
G06F 3/0486    (2013.01)
```

(52) U.S. Cl.
CPC ....... *G06F 16/2379* (2019.01); *G05B 19/042* (2013.01); *G06F 3/0482* (2013.01); *G06F 3/0486* (2013.01); *G05B 2219/25011* (2013.01)

(58) Field of Classification Search
CPC .. G06F 16/2379; G06F 3/0482; G06F 3/0486; G05B 19/042; G05B 2219/25011
See application file for complete search history.

(56) References Cited

U.S. PATENT DOCUMENTS

| | | | | |
|---|---|---|---|---|
| 2008/0282198 | A1* | 11/2008 | Brooks | G06F 3/0482 715/854 |
| 2010/0211535 | A1* | 8/2010 | Rosenberger | G06F 16/48 706/20 |
| 2013/0218349 | A1* | 8/2013 | Coogan | G06F 8/34 700/275 |
| 2015/0227531 | A1* | 8/2015 | Kulesza | G06F 3/0486 715/739 |
| 2015/0317295 | A1* | 11/2015 | Sherry | G06F 40/117 715/226 |
| 2017/0201599 | A1* | 7/2017 | North | G06F 3/04847 |
| 2019/0235455 | A1* | 8/2019 | Michals | G05B 19/042 |
| 2019/0235545 | A1 | 8/2019 | Michals et al. | |
| 2019/0372793 | A1* | 12/2019 | Marti | G05B 15/02 |
| 2020/0106634 | A1* | 4/2020 | Jaworski | H04L 67/125 |
| 2021/0063039 | A1* | 3/2021 | Hallendy | F24F 11/64 |
| 2021/0390509 | A1* | 12/2021 | Fowler | G06K 7/10297 |

OTHER PUBLICATIONS

PCT Search Report dated Oct. 18, 2021, for PCT Application No. PCT/US2021/040824, 13 pages.

* cited by examiner

*Primary Examiner* — Rashawn N Tillery

(57) ABSTRACT

There are described building management systems and methods for managing tag bundles of a data model. The system comprises a memory component, a user interface, and a processor. The memory component stores a tag bundle that includes one or more tag fields. The user interface identifies one or more records, in which each record includes at least one tag and each record corresponds to a point of the building management system. Each tag defines a structural or functional relationship between points of the building management system. The processor updates the tag or tags of the record(s) based on the tag field or fields of the tag bundle.

20 Claims, 6 Drawing Sheets

US 11,507,567 B2

FRAMEWORK FOR MANAGING TAG BUNDLES

FIELD OF THE INVENTION

This application relates to the field of building management systems and, more particularly, to a framework for managing metadata tags of a building management system.

BACKGROUND

Building management systems encompass a wide variety of systems that aid in the monitoring and control of various aspects of building operation for building owners, facility managers, system integrators, and users. Building management systems include various environmental control subsystems, such as security, fire safety, lighting, and heating, ventilation, and air conditioning ("HVAC"). Systems may include on-site and remote building components and operate with third-party subsystems. Unfortunately, since subsystems have been developed separately by different manufacturers, each subsystem operates on its own proprietary protocol. Although standardization has been attempted for building management, there are still many different standards currently in-play, such as BACnet, Modbus, SNMP, and OPC. The situation has been further complicated by the addition of wireless of IoT technologies to building management.

To address this issue, a building management system may include a frontend framework that manages differing networks of backend devices on a common platform. The framework may utilize semantic data models and tagging features to manage specific and overall building management for backend devices. In particular, metadata tags of the framework associate backend devices with system features such as graphics, histories, alarms, schedules, and notes. For example, the framework allows the system to automate the generation of schematics, reports, and analytics across its multiple subsystems.

Defining and editing database records with the correct metadata tags to create desired functionality can be challenging, particularly when multiple tags and multiple records are involved. Some conventional systems have batch editing tools to facilitate manual changes to a configuration database. However, these manual processes of are time consuming and prone to significant errors.

SUMMARY

In accordance with various embodiments of the disclosure, there is provided a tag bundling approach for a building management system. The approach has a data model that uses tags and their properties (e.g., definitions and types) to express relationships between points of a building management system. The tag bundles allow a user to create and save frequently used tag executions. After creating and saving the tag bundle, the tag bundle may be applied to a record or group of records. For some embodiments, the tab bundle may allow the user to assign tags and their properties to multiple records at one time. In order to create a given functionality, the tab bundle includes one or more fields that define various aspects of the bundle, such as the tags to be added and/or removed. Accordingly, a non-expert level user may bring about changes to his or her database without the detailed expertise needed to define the tags and filter the records. In the manner, the features provide cost savings by minimizing labor and errors.

One aspect is a building management system for managing tag bundles of a data model comprising a memory component, a user interface, and a processor. The memory component is configured to store a tag bundle that includes one or more tag fields. The user interface is configured to identify one or more records. Each record includes at least one tag, and each record corresponds to a point of the building management system. Each tag defines a structural or functional relationship between points of the building management system. The processor is configured to update the tag or tags of the record(s) based on the tag field or fields of the tag bundle.

Another aspect is a method of a building management system for managing tag bundles of a data model. A tag bundle that includes one or more tag fields is identified. One or more records are identified, in which each record includes at least one tag, and each record corresponds to a point of the building management system. Each tag defines a structural or functional relationship between points of the building management system. The tag or tags of the record(s) are updated based on the tag field or fields of the tag bundle.

Yet another aspect is a non-transitory computer readable medium including executable instructions. When executed, the non-transitory computer readable medium causes one or more processors to manage tag bundles for a building management system by executing the method described above.

The above described features and advantages, as well as others, will become more readily apparent to those of ordinary skill in the art by reference to the following detailed description and accompanying drawings. While it would be desirable to provide one or more of these or other advantageous features, the teachings disclosed herein extend to those embodiments which fall within the scope of the appended claims, regardless of whether they accomplish one or more of the above-mentioned advantages.

BRIEF DESCRIPTION OF THE DRAWINGS

For a more complete understanding of the present disclosure, and the advantages thereof, reference is now made to the following descriptions taken in conjunction with the accompanying drawings, wherein like numbers designate like objects.

DETAILED DESCRIPTION

Figure 1:
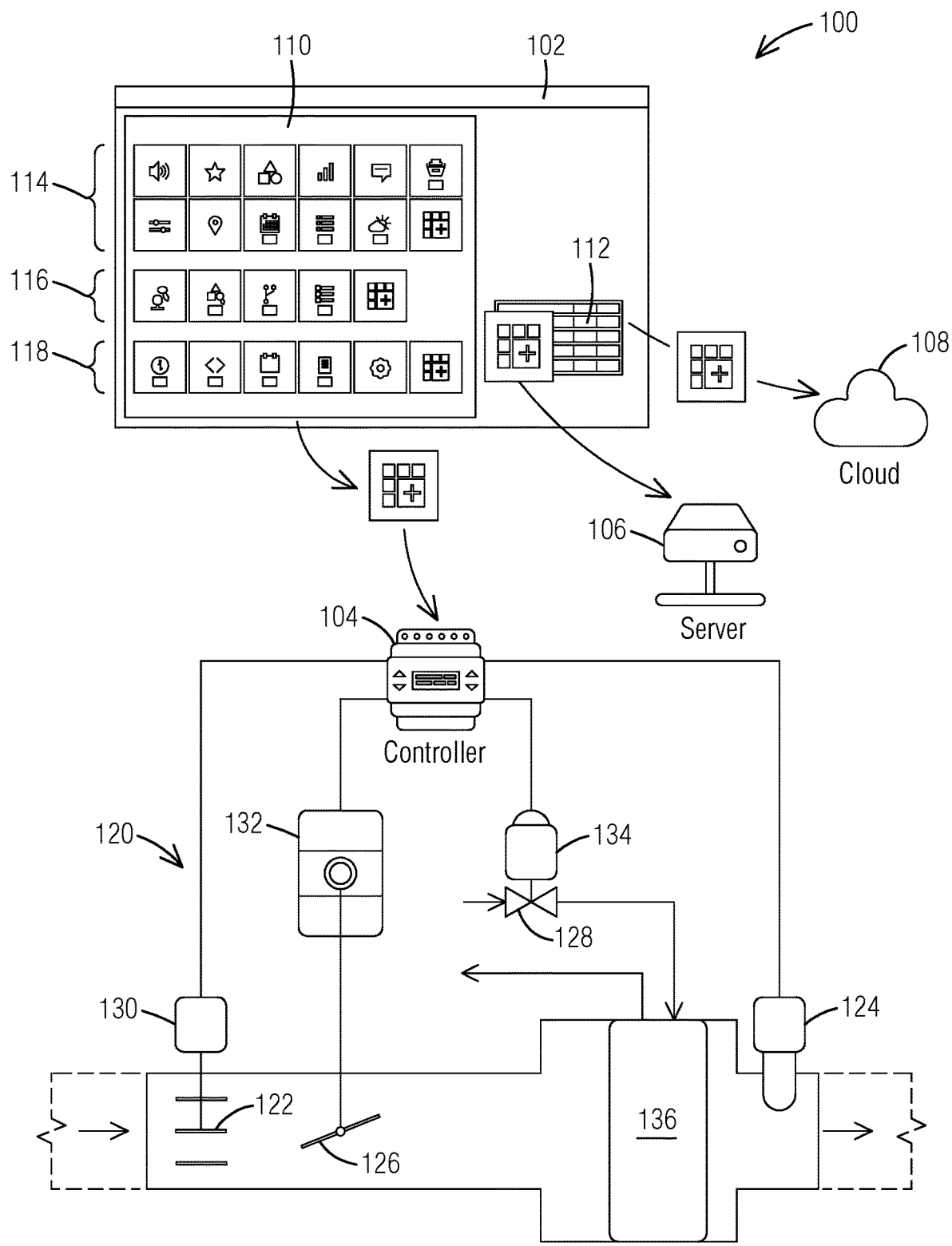
FIG. 1 is an illustration of a framework in an example implementation that is operable to employ techniques described herein.

Various technologies that pertain to systems and methods for managing metadata tags of a building management system will now be described with reference to the drawings, where like reference numerals represent like elements throughout. The drawings discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged apparatus. It is to be understood that functionality that is described as being carried out by certain system elements may be performed by multiple elements. Similarly, for instance, an element may be configured to perform functionality that is described as being carried out by multiple elements. The numerous innovative teachings of the present application will be described with reference to exemplary non-limiting embodiments.

A framework of the building management system standardizes the interpretation and flow of data for components and devices of a building. One feature of the framework, namely metadata tagging, enables automation of configuration tasks for the building management system that would otherwise need to be performed manually by an engineer or technician for each project. By tagging data, the framework is able to identify the data and execute actions to manage the performance of the building. These metadata tags enable the building management system to automatically process and share the data for a variety of subsystems irrespective of the source of the data.

Metadata tags may be added to points of a building management system in a variety of ways. Typically, a point is associated with a device component, such as a sensor or actuator, and/or a device function, such as a command, setpoint or schedule log. The conventional method for adding metadata tags is to identify a record of a point function and manually associate one or more tags with the point function, which is quite time consuming and error prone. The framework described herein includes a tag bundle that automatically assigns one or more metadata tags to multiple point functions.

The framework implements a data model, including tags and their properties, that express relationships between points of a building management system. The framework includes one or more tag bundles that allow a user to create and save frequently used tag executions. Each tag bundle becomes a tool for subsequent application to a record or group of records. For some embodiments, the group of records may be predefined as a saved filter to be applied to a database. For those embodiments, the tag bundle may be used in conjunction with the saved filter, thus applying the tag bundle to the group of records.

Referring to FIG. 1, there is shown a framework 100 in an example implementation that is operable to employ techniques described herein. The framework 100 includes a framework window 102 as well as one or more devices of the building management system to apply the framework. Examples of devices of the building management system include, but are not limited to, application specific controllers 104, global controllers and servers 106, and/or enterprise-level or Cloud devices 108.

The framework window 102 includes a list of apps 110 to support the framework 100 and a site directory 112 to identify the facilities and/or locations managed by the framework 100. As shown in FIG. 1, the list of apps may be categorized by groups, such as end user apps 114, system integration apps 116, and advanced apps 118. Examples of end use apps 114 may include, but are not limited to, alarms, favorites, graphics, historian, notes, operation and maintenance manuals, overrides, point graphics, schedules, summary, weather, OEM (third party), and other associated apps. Examples of system integration apps 116 include, but are not limited to, database builder, graphics builder, logic builder, summary builder, OEM, and other associated apps. Examples of advanced apps 118 include, but are not limited to, debug, functions, host, jobs, settings, OEM, and other associated apps.

Controllers 104, as part of the building management system, may be capable of receiving sensed data from equipment 120 associated with one or more zones managed by an HVAC or other building system as well as provide control instructions to the equipment. As such, the controller 104 may be connected to various components of the equipment. The equipment 120 may include sensors, such as a velocity sensor 122 and/or a temperature sensor 124, for detecting conditions at the equipment as well as component controllers, such as a damper 126 and/or a valve 128, to influence conditions at the equipment. For example, a controller 104 may be couple to the velocity sensor 122 directly or via a velocity module 130 for providing periodic recalibration, and/or the temperature sensor 124 associated with the zone(s). As other examples, the controller 104 may control the damper 126 via a modulated damper actuator 132 to manage air flow and/or the valve 128 via a valve module 134 in order to manage fluid flow for a heating or cooling subsystem 136. It is to be understood that the building management system may include a wide variety of controllers 104, and the controllers described herein are mere examples of such controllers.

Figure 2:
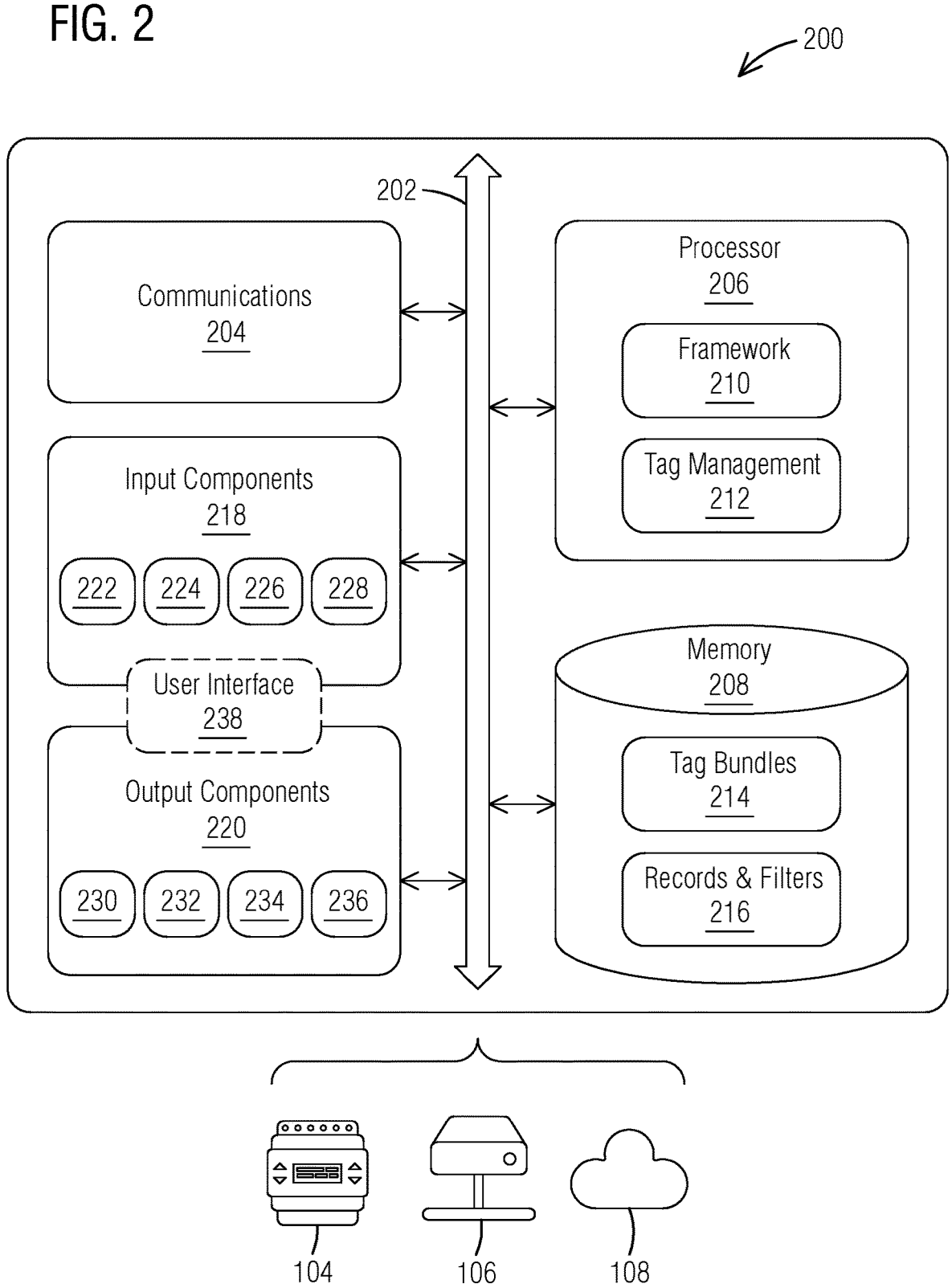
FIG. 2 is a block diagram of a tag bundling system, which is part of a building management system, in an example implementation for the framework of FIG. 1.

Referring to FIG. 2, there is shown an example implementation of a tag bundling system 200, which is part of a building management system. The tag bundling system 200 may be implemented in one or more devices of the building management system, such as the application specific controllers 104, the global controllers and servers 106, and/or the enterprise-level or Cloud devices 108. FIG. 2 represents example device components 200 of the implemented device(s) 104-108 in accordance with the tag bundling approach. The device components 200 comprise a communication bus 202 for interconnecting the other device components directly or indirectly, one or more communication components 204 communicating other entities via a wired or wireless network, one or more processors 206, and one or more memory components 208. The one or more processors 206 may execute code and process data received at other components of the device components 200, such as information received at the communication component 204 or stored at the memory component 208. The code associated with the building management system and stored by the memory component 208 may include, but is not limited to, operating systems, applications, modules, drivers, and the like. An operating system includes executable code that controls basic functions of the implemented device 104-108, such as interactions among the various components of the device components 200, communication with external devices via the communication component 204, and storage and retrieval of code and data to and from the memory component 208.

Each application includes executable code to provide specific functionality for the processor 206 and/or remaining components of the implemented device 104-108. Examples of an applications executable by the processor 206 includes, but are not limited to, a framework module 210 to manage the general operation of the device in accordance with the framework 100 and a tag management module 212 to manage the tags associated with the device, including an operation to update one or more tags of a record or group of records.

Data, stored by the memory component 208, is information that may be referenced and/or manipulated by an operating system or application for performing functions of the implemented device 104-108. Examples of data stored by the memory component 208 may include, but are not limited to, tag bundles 214 and one or more records 216. The memory component 208 may store a tag bundle 214 that includes one or more tag fields. For multiple records 216, a group of records may be associated with a filter that specifies the records, i.e., saved filter.

The device components 200 of the implemented device 104-108 may further comprise input components 218 and output components 220. The input components and the output components 218, 220 may include one or more visual 222, 230, audio 224, 232, mechanical 226, 234, and/or other components 228,236. A user interface 238 of the device components 200 may include portions of the input and output components 218, 220 and be used to interact with a user of the implemented device 104-108. For example, the user interface 238 may include a combination of hardware and software to provide a user with a desired user experience. The user interface 238 may identify one or more records, in which each record may include one or more tags and correspond to a point of the building management system. Each tag may define a structural or functional relationship between points of the building management system.

It is to be understood that FIG. 2 is provided for illustrative purposes only to represent examples of the device components 200 of the implemented device 104-108 and is not intended to be a complete diagram of the various components that may be utilized by each device. The implemented device 104-108 may include various other components not shown in FIG. 2, may include a combination of two or more components, or a division of a particular component into two or more separate components, and still be within the scope of the present invention.

Figure 3:
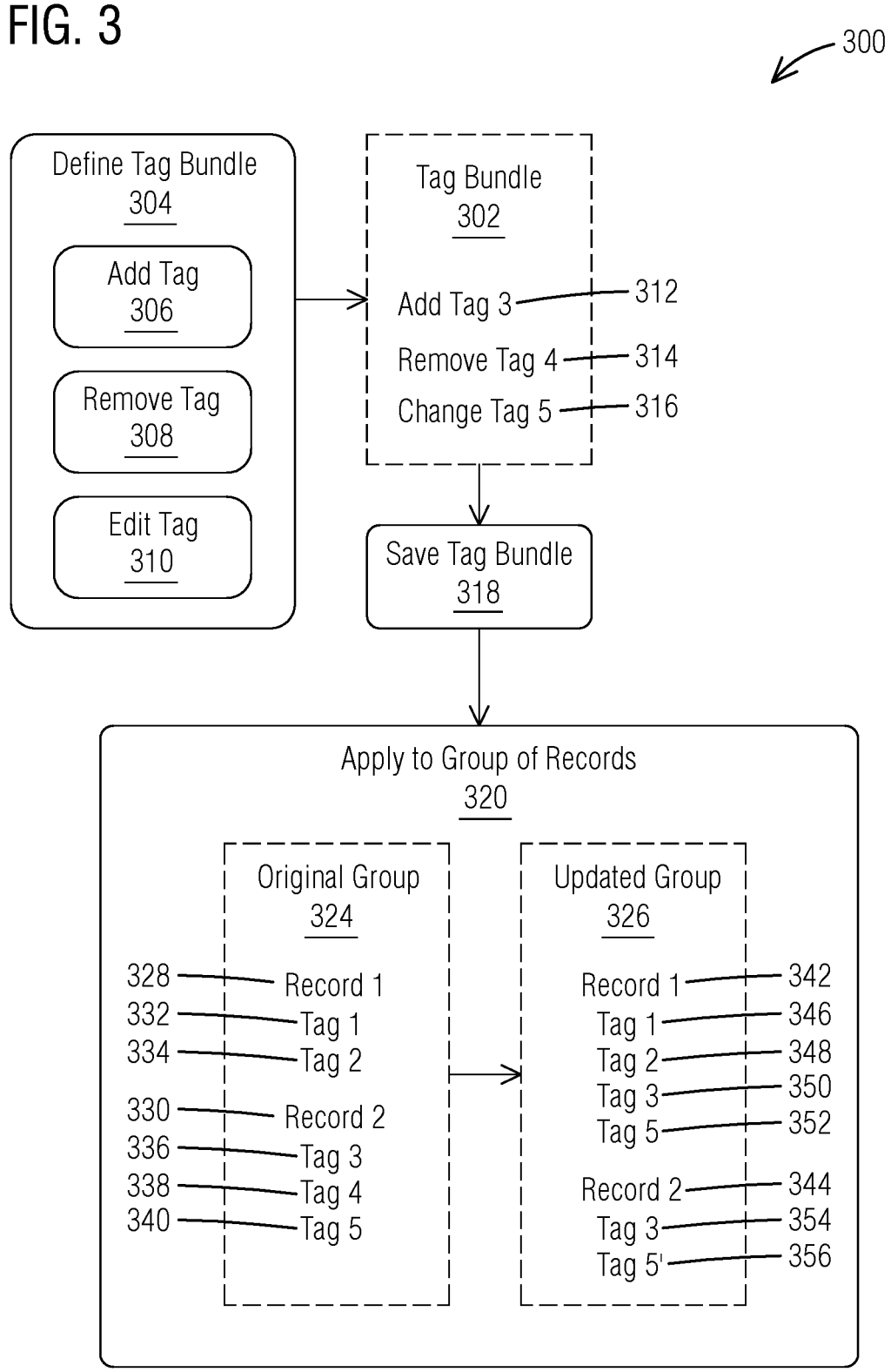
FIG. 3 is a flow diagram of a tag bundling operation in an example implementation for the framework of FIG. 1.

Referring to FIG. 3, there is shown an example implementation of a tag bundling operation 300 in accordance with the framework 100. For example, one of the apps 110 identified by the framework window 102 of FIG. 1, such as a system integration app 116, may include and implement the tag bundling operation 300. Initially, for the tag bundling operation, one or more tag bundles 302 are defined (304). Each tag bundle 302 may be defined at the user interface 238 of the device components 200 by adding a tag to the tag bundle (306), removing a tag from the tag bundle (308), otherwise editing the tag bundle (310), or a combination of these functions. Each tag bundle 302 includes one or more operations for tag management. For example, each tag bundle 302 may include at least one add operation 312 for adding a tag to a record, at least one remove operation 314 to remove at least one tag from a record, at least change operation 316 to modify a tag of a record, or a combination these operations. After defining the tag bundle (304), the tag bundle 302 may be saved (318) automatically in response to adding, removing, and/or editing one or more tags of the tag bundle at the user interface 238 or manually in response to a user input at the user interface.

Whether saved or not (318), each tag bundle 302 may applied to a record or a group of records (320) after being defined (304). The application of the tag bundle 302 (320) converts a first record or group 324 to a second record or group 326. For embodiments in which the first group 324 is a group of records, the first group may include multiple records 328, 330 and each record may include one or more tags 332-340. For example, as shown in FIG. 3, the first group 324 may be an original group that includes a first original record 328 and a second original record 330. The first original record 328 may include at least one tag, such as a first tag 332 and a second tag 334, and the second original record 330 may include at least one tag, such as a third tag 336, a fourth tag 338 and a fifth tag 340. After conversion, the second group 326 may result from the first group 324 in response to application of the tag bundle 302 to the first group (320). For example, as shown in FIG. 3, the second group 326 may be an updated group that includes a first updated record 342 corresponding to the first original record 328 and a second updated record 344 corresponding to the second original record 330. The first updated record 342 may include at least one tag, such as a sixth tag 346, a seventh tag 348, an eighth tag 350, and a ninth tag 352, and the second updated record 344 may include at least one tag, such as a tenth tag 354 and an eleventh tag 356.

Where the tag bundle 302 does not includes one or more operations associated with a record of the first group 324, then each tag of the first group without a corresponding operation may remain in the corresponding record of the second group 326. For example, as shown in FIG. 3, the first and second tags 332, 334 of the first group 324 is not associated with an operation of the tag bundle 302, so the sixth and seventh tags 346, 348 of the second group 326 corresponds to the first and second tags.

Where the tag bundle 302 includes one or more add operations 312 and/or change operations 316 that are not associated with a record of the first group 324, then an additional tag associated with the add operation may be added to the corresponding record of the second group 326. For example, as shown in FIG. 3, the tag bundle 302 includes an add operation 312 and a change operation 316 that do not correspond to tags of the first group 324, so the eighth tag 350 and the ninth tag 352 are added to the second group 326.

Where the tag bundle 302 includes one or more add operations 312 that are associated with a record of the first group 324, then each tag of the first group associated with the add operation 312 may remain in the corresponding record of the second group 326. For example, as shown in FIG. 3, the tag bundle 302 includes an add operation 312 that corresponds to a tag (tag 336) of the first group 324, so the tenth tag 354 is included to the second group 326.

Where the tag bundle 302 includes one or more remove operations 314 that are associated with a record of the first group 324, then the identified tag corresponding to the remove operation may be omitted from the corresponding record of the second group 326. For example, as shown in FIG. 3, the fourth tag 338 of the first group 324 is associated with the remove operation 314 of the tag bundle 302, so the second group 326 does not include a tag corresponding to the fourth tag.

Where the tag bundle 302 includes one or more change operations 316 associated with a record of the first group 324, then the identified tag corresponding to the change operation may be updated for the corresponding record of the second group 326. For example, as shown in FIG. 3, the fifth tag 340 of the first group 324 is associated with the change operation 316 of the tag bundle 302, so the second group 326 includes an eleventh tag 356 that is essentially a modified version of the fifth tag. Properties of a tag that may be changed by a change operation 316 include, but not limited to, essential information, tag name, associated equipment, equipment status, equipment value, and equipment location.

It should be noted that, where an add operation 312 specified by the tag bundle 302 corresponds to a tag of the first record or records 324, application of the tag bundle 302 (320) will not change the record or records. As a result, the first and second groups 324, 326 would both have a single instance of that particular tag. Similarly, where a remove operation 314 specified by the tag bundle 302 does not correspond to a tag of the first record or records 324, application of the tag bundle 302 (320) will not change the record or records. As a result, neither of the first and second groups 324, 326 would have the tag to be removed.

For some embodiments, the tag bundle tool may bring together a saved tag bundle and a saved filter. A group of records resulting from the saved filter is transforms based on the definition of the tag bundle resulting in an updated group of records for a database or other forms of storage. For this purpose, each tag bundle may identify common tags that one may want to add to a group of devices. For example, a tag bundle may allow a user to select a point record, such as space/room temperature, and drag the point record to a tag bundle, such as histories. As a result, the tag bundle tool changes the point record to add, remove, and/or edit tags of the point record.

Figure 4A:
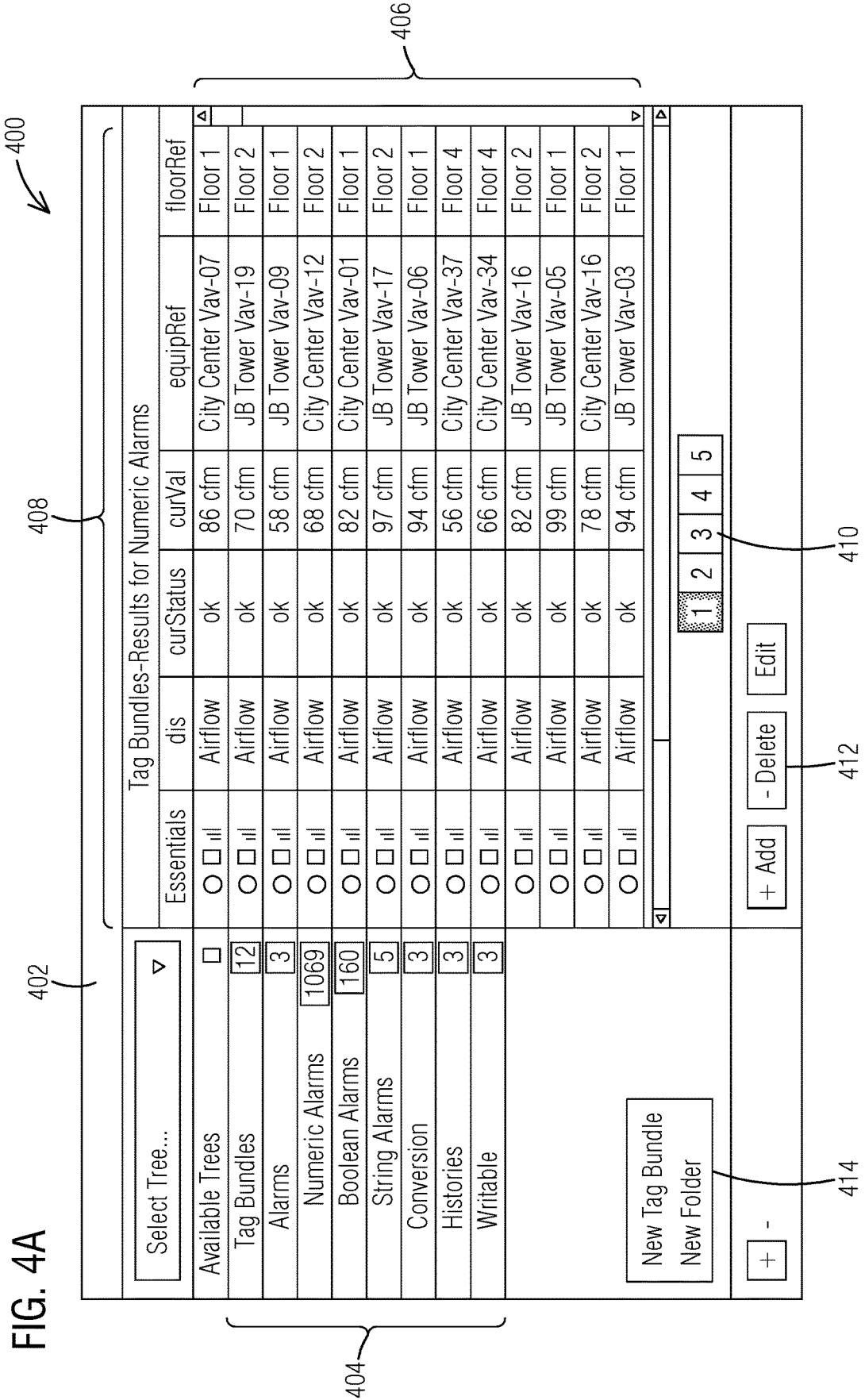
FIGS. 4A & 4B are screen views illustrating example aspects of defining tag bundles for the tag bundling operation of FIG. 3.
Figure 4B:
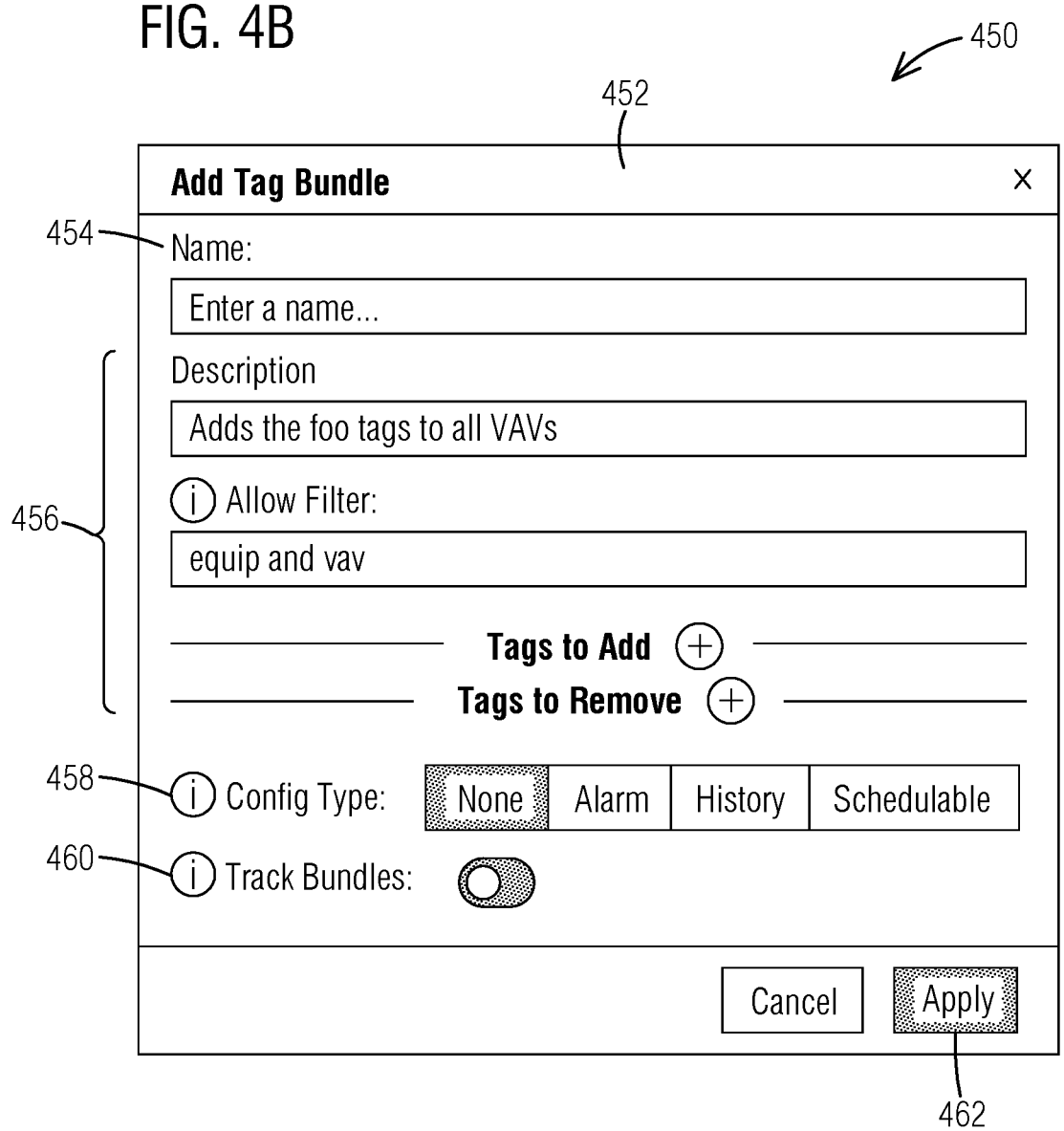

FIGS. 4A and 4B illustrate example aspects of defining tag bundles (302) for the tag bundling operation 300 shown in FIG. 3. The tab bundles allow a user to assign tags and properties to one or many records at one time. A user may operate a user interface 238 of a device 104, 106, 108 to navigate to the tag bundle tool of the building management system. Referring specifically to FIG. 4A, there is shown an example representation of a first window 400 of the tag bundle tool. The first window 400 may include an identifying header 402 and a tag bundles tree 404. The tag bundles tree 404 allows a user to create and save frequently used tag executions. Examples of tag executions include, but are not limited to, alarms, conversion, histories, and writable. Each tag execution may include one or more subcategories. For example, subcategories of the alarm include, but are not limited to, numeric alarms, Boolean alarms, and string alarms.

Results 406 for a selected tag execution or subcategory may be provided at another section of the first window 400. For example, the results 406 may be display adjacent to, or otherwise distinct from, the tag bundles tree 404. Each element of the results 406 may include various result properties 408 such as, but not limited to, alarm essential information, tag display name, equipment current status, equipment current value, associated equipment, and equipment location. The first window may show a portion of the results if the quantity of results 406 exceeds the display capability of the window, so a pagination indicator 410 or selector may be provided by the window to navigate the results. The first window 400 may further includes operational buttons 412 to add a new element to, delete an existing element of, or edit an exiting element of the results 406.

To add, delete, or edit a tag bundle at the tag bundle tool, a user may operate a user interface 238 of a device 104, 106, 108 to select bundle selection area 414. Referring to FIG. 4B, a second window 450 associated with the tag bundle is displayed in response to selection of the bundle selection area 414 to add or edit the tag bundle. Editing of a tag bundle requires selection of a particular tag bundle. The second window 450 includes a header 452, a tag bundle name field 454, as well as one or more associated fields 456 that manage functionality or other aspects of the tag bundle. Each of the associated fields 456 may be associated with a building management type, a building management location, or a building management function of the point of the building management system. In particular, the second window 450 may provide associated fields 456 that may include, but may not be limited to, a tag bundle description, one or more add operations for adding tags to a record, one or more remove operations for removing tags from a record, and one or more filters (such as saved filters) to identify records to apply changes based on the tag field, i.e., add and/or remove tags. For example, as shown in FIG. 4B, a user may select "Tags to Add" or "Tags to Remove" in order to reveal one or more fields for entry of data for add operations or remove operations, respectively. The associated fields 456 may include one or more change operations for updating an aspect of an existing tag or, in the alternative, one of the existing fields (such as the field for add operations) may be used for entry of change operations. It is to be noted that a filter feature of the tag bundle tool allows a user to find records when attempting to execute changes on records. Various embodiments of the filter feature includes searching for a saved filter previously created, an existing point, or an existing record or group of records. Saved filters may be executed in the future to obtain the filter query results.

For some embodiments, the second window 450 may also include one or more selection menus 458 and/or one or more selection indicators 460 to further specify functionality for the tag bundle. An example of a selection menu 458 is a configuration type where the user may specify the type of bundle for the application. For example, an alarm may be selected so that it appear in a configuration app associated with the alarm (see end use apps 114 in reference FIG. 1 above). For the same or other embodiments, an additional option may appear in the second window 450 in response to a selection at the selection menu 458. In particular, the additional option (not shown) may allow the user to select a point kind associated with a type of point for the application so that the tag bundle only appears for an appropriate type of configuration app. An example of a selection indicator 460 is a track bundle switch in which the user may specify if whether to automatically track the tag bundle to adds a tag depending on what selected at the selection menu 458. For example, selection of the track bundle box (for alarm, history, or schedulable) may add a configuration tag (for alarm, history, or schedulable configuration) on the point record and list the name of tag bundle(s) being used by the particular point. The second window 450 further includes a completion button 462 when the user has completed selection of all desired fields.

Figure 5:
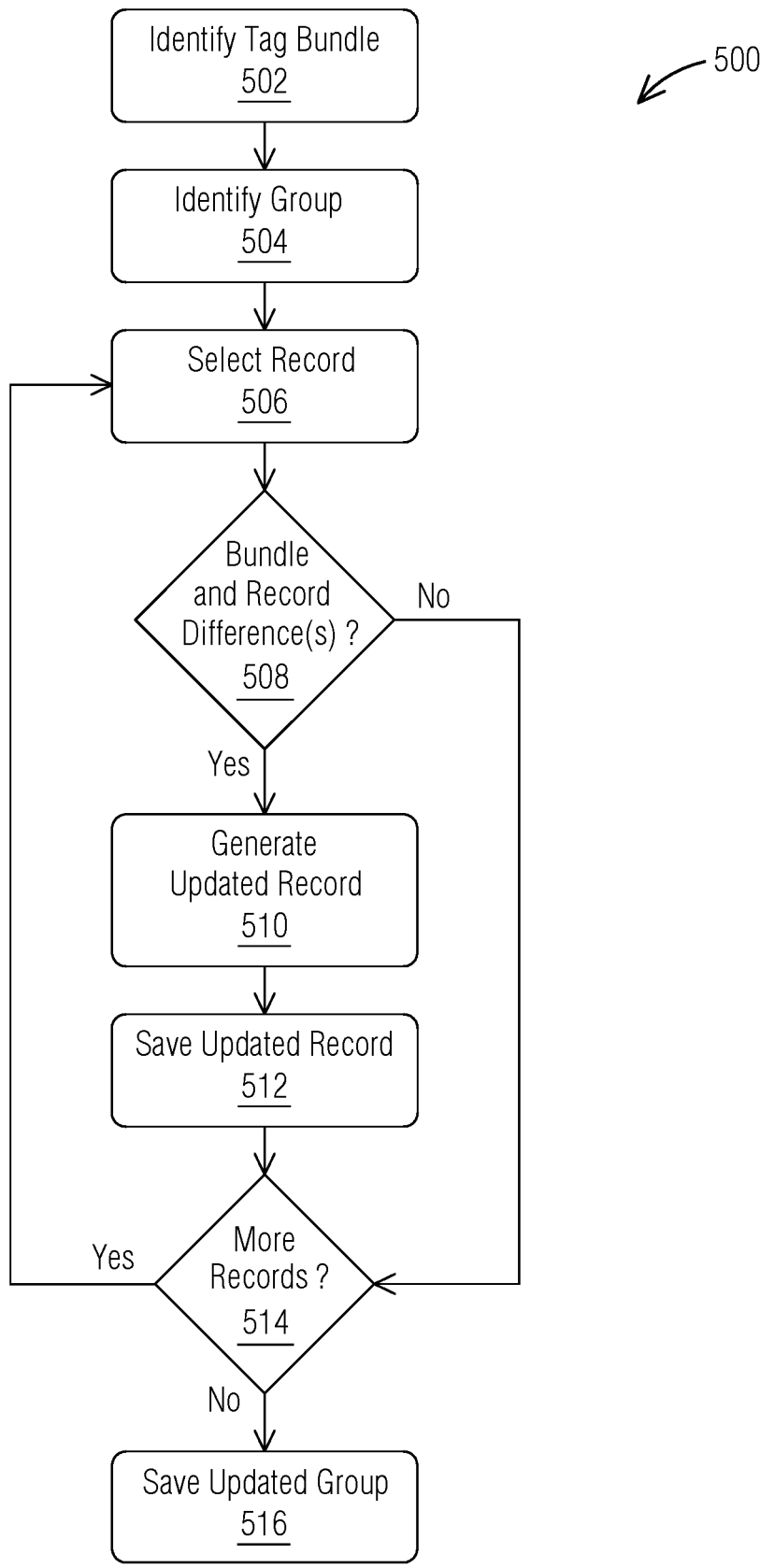
FIG. 5 is a flow diagram illustrating example aspects of applying tag bundles for the tag bundling operation of FIG. 3.

FIG. 5 illustrates an example implementation of the tag bundling operation 500 of a building management system for managing tag bundles of a data model, including example aspects of applying tag bundles (314) for the operation. For this operation 500, the building management system identifies a tag bundle that includes one or more tag fields (502). The building management system also identifies one or more records (504), such as a record or a group of records. Each record includes at least one tag and corresponds to a point of the building management system. Each tag defines a structural or functional relationship between points of the building management system. For some embodiments, identifying the records includes dragging-and-dropping, via the user interface 238, a representation of the tag bundle to the records.

The building management system updates the tags of each record based on the tag fields of the tag bundle (506-514), in response to identification of the tag bundle and the record(s) (502, 504) or in response to a user selection at the user interface 238 of the device 104, 106, 108. Where there is only one records, the system updates the record based on the tag bundle. For some embodiments that includes multiple records (i.e. a group of records), the building management system updates the tags of each record one-by-one. The system selects a particular record of the group (506) and compares the tags of the record to the tags of the identified tag bundle (508). In response to identifying the differences between the tag bundle and the particular record (508), the system generates a second "updated" record based on the first "original" record (510). The system may update tags associated with the records by adding a new tag, identified by the tag field of the tag bundle, to the records in response to determining that the records are not associated with the new tag. The building management system may also update tags associated with the records, in the alternative to or in addition to adding a new tag, by removing an existing tag, identified by the tag field of the tag bundle, from the records in response to determining that the records are associated with the existing tag. The system may save the second record at a memory portion 208 of a device 104, 106, 108 in response to generating the second record (512). The system may then select another record of the group (506) until all records of the group have been updated (514).

For any records having similar tags to the tags of the tag bundle (508), the system may move-on to the next record of the group (506) until all records of the group have been updated (514). For records similar to the tag bundle, the system may, in the alternative, generate and/or save the second record (510, 512) by substantially duplicating the first record before moving-on to the next record of the group (506). For some other embodiments that includes multiple records, the building management system may update two or more tags together. Regardless of whether second "updated" records have been saved earlier or not, for some embodiments, the system may save some or all records of each group (516) in response to completing its updates to all records of the group.

Those skilled in the art will recognize that, for simplicity and clarity, the full structure and operation of all data processing systems suitable for use with the present disclosure are not being depicted or described herein. Also, none of the various features or processes described herein should be considered essential to any or all embodiments, except as described herein. Various features may be omitted or duplicated in various embodiments. Various processes described may be omitted, repeated, performed sequentially, concurrently, or in a different order. Various features and processes described herein can be combined in still other embodiments as may be described in the claims.

It is important to note that while the disclosure includes a description in the context of a fully functional system, those skilled in the art will appreciate that at least portions of the mechanism of the present disclosure are capable of being distributed in the form of instructions contained within a machine-usable, computer-usable, or computer-readable medium in any of a variety of forms, and that the present disclosure applies equally regardless of the particular type of instruction or signal bearing medium or storage medium utilized to actually carry out the distribution. Examples of machine usable/readable or computer usable/readable mediums include: nonvolatile, hard-coded type mediums such as read only memories (ROMs) or erasable, electrically programmable read only memories (EEPROMs), and user-recordable type mediums such as floppy disks, hard disk drives and compact disk read only memories (CD-ROMs) or digital versatile disks (DVDs).

Although an example embodiment of the present disclosure has been described in detail, those skilled in the art will understand that various changes, substitutions, variations, and improvements disclosed herein may be made without departing from the spirit and scope of the disclosure in its broadest form.

What is claimed is:

1. A building management system for managing tag bundles of a data model comprising:
   a memory component configured to store a tag bundle that include at least one tag field;
   a user interface configured to associate a plurality of records with the tag bundle, wherein each record of the plurality of records includes at least one tag and corresponds to a point of the building management system, and each tag of the at least one tag defines a structural or functional relationship between points of the building management system; and
   a processor configured to update the at least one tag of the plurality of records, in response to the user interface associating the plurality of records with the tag bundle, based on the at least one tag field of the tag bundle.

2. The system as described in claim 1, wherein the at least one tag field identifies at least one selected from a group consisting of a new tag to be added to the plurality of records or an existing tag to be removed from the plurality of records.

3. The system as described in claim 2, wherein the at least one tag field further identifies which records of the plurality of records to apply the at least one tag field.

4. The system as described in claim 1, wherein the user interface identifies the plurality of records by dragging-and-dropping a representation of the tag bundle to the plurality of records.

5. The system as described in claim 1, wherein the processor updates tags associated with the plurality of records by:
   adding a new tag identified by the at least one tag field to the plurality of records based on a lack of association of the plurality of records to the new tag; and
   removing an existing tag identified by the at least one tag field from the plurality of records based on an association of the plurality of records to the existing tag.

6. The system as described in claim 1, wherein the user interface generates the tag bundle by providing, to a tag bundle window, an identification of the tag bundle and at least one selected from a group consisting of a new tag to be added or an existing tag to be removed.

7. The system as described in claim 1, wherein the at least one tag field is associated with a building management type, a building management location, or a building management function of the point of the building management system.

8. A method of a building management system for managing tag bundles of a data model, the method comprising:
   identifying a tag bundle that includes at least one tag field;
   associating a plurality of records with the tag bundle, each record of the plurality of records includes at least one tag and corresponds to a point of the building management system, and each tag of the at least one tag defines a structural or functional relationship between points of the building management system; and
   updating the at least one tag of the plurality of records, in response to associating the plurality of records with the tag bundle, based on the at least one tag field of the tag bundle.

9. The method as described in claim 8, wherein the at least one tag field identifies at least one selected from a group consisting of adding a new tag to the plurality of records or removing an existing tag from the plurality of records.

10. The method as described in claim 9, wherein the at least one tag field further identifies which records of the plurality of records at least one record to apply the at least one tag field.

11. The method as described in claim 8, wherein identifying the plurality of records includes dragging-and-dropping, via a user interface, a representation of the tag bundle to the plurality of records.

12. The method as described in claim 8, wherein updating tags associated with the plurality of records comprises:
   adding a new tag identified by the at least one tag field to the plurality of records in response to determining that the plurality of records is not associated with the new tag; and
   removing an existing tag identified by the at least one tag field from the plurality of records in response to determining that the plurality of records is associated with the existing tag.

13. The method as described in claim 8, further comprising generating the tag bundle by providing to a tag bundle window, via a user interface, an identification of the tag bundle and at least one selected from a group consisting of a new tag to be added or an existing tag to be removed.

14. The method as described in claim 8, wherein the at least one tag field is associated with a building management type, a building management location, or a building management function of the point of the building management system.

15. A non-transitory computer readable medium including executable instructions which, when executed, causes at least one processor to manage tag bundles for a building management system by:
   identifying a tag bundle that includes at least one tag field;
   associating a plurality of records with the tag bundle, wherein each record of the plurality of records includes at least tag and corresponds to a point of the building management system, and each tag of the at least one tag defines a structural or functional relationship between points of the building management system; and
   updating the at least one tag of the plurality of records, in response to associating the plurality of records with the tag bundle, based on the at least one tag field of the tag bundle.

16. The non-transitory computer readable medium as described in claim 15, wherein the at least one tag field identifies at least one selected from a group consisting of adding a new tag to the plurality of records or removing an existing tag from the plurality of records.

17. The non-transitory computer readable medium as described in claim 16, wherein the at least one tag field further identifies which records of the plurality of records to apply the at least one tag field.

18. The non-transitory computer readable medium as described in claim 15, wherein identifying the plurality of records includes dragging-and-dropping, via a user interface, a representation of the tag bundle to the plurality of records.

19. The non-transitory computer readable medium as described in claim 15, wherein updating tags associated with the plurality of records comprises:
   adding a new tag identified by the at least one tag field to the plurality of records in response to determining that the plurality of records is not associated with the new tag; and
   removing an existing tag identified by the at least one tag field from the plurality of records in response to determining that the plurality of records is associated with the existing tag.

20. The non-transitory computer readable medium, as described in claim 15, further causes the at least one processor to generate the tag bundle by providing to a tag bundle window, via a user interface, an identification of the tag bundle and at least one selected from a group consisting of a new tag to be added or an existing tag to be removed.

\* \* \* \* \*